Figure 3:
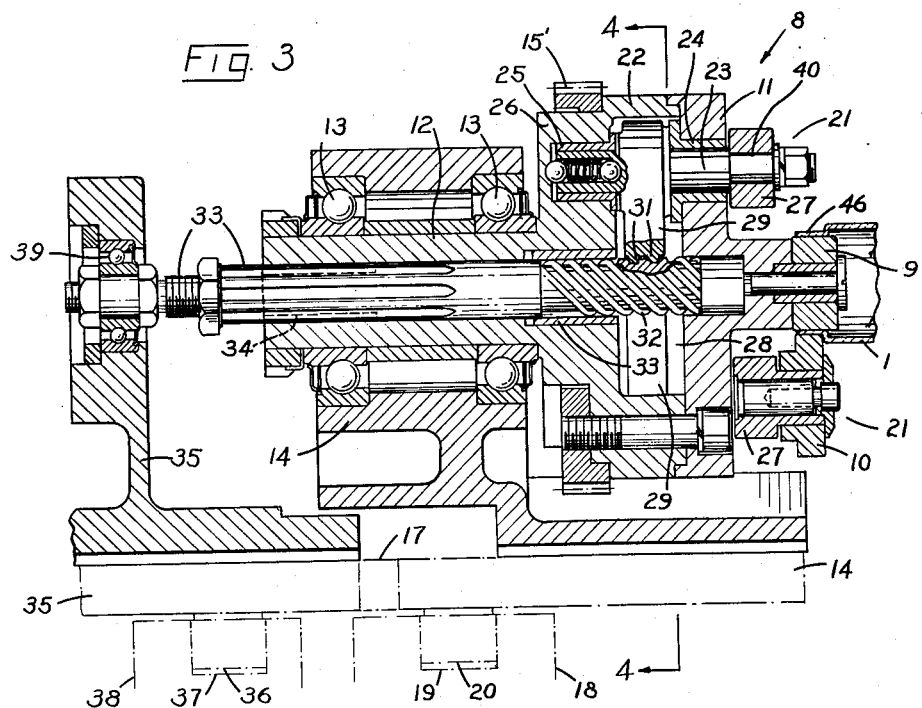

Oct. 28, 1952  R. E. GOSNELL ET AL  2,615,285
GLASS TUBE RESHAPING APPARATUS
Filed Nov. 1, 1951  2 SHEETS—SHEET 1
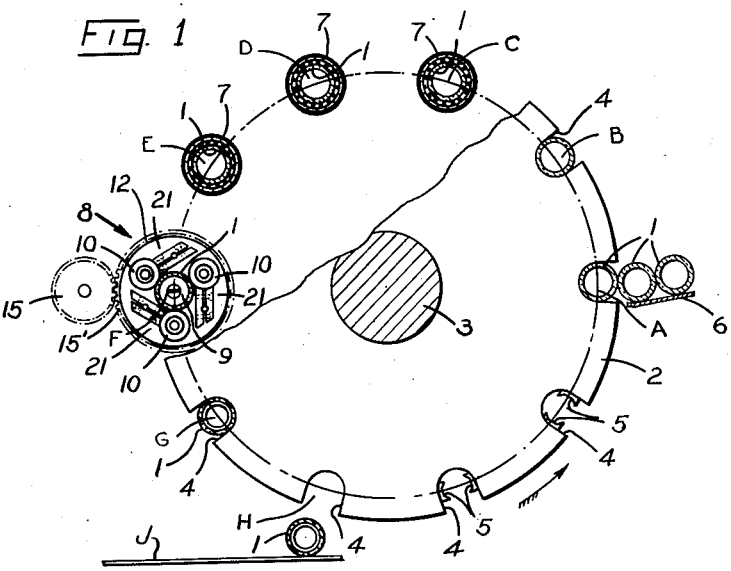
Inventors:
Robert E. Gosnell,
Adrien F. Casler,
by Vernet C. Kauffman
Their Attorney Oct. 28, 1952 — R. E. GOSNELL ET AL — 2,615,285
GLASS TUBE RESHAPING APPARATUS
Filed Nov. 1, 1951 — 2 SHEETS—SHEET 2

Inventors:
Robert E. Gosnell
Adrien F. Casler
by Vernet C. Kauffman
Their Attorney Patented Oct. 28, 1952

2,615,285

UNITED STATES PATENT OFFICE 2,615,285

GLASS TUBE RESHAPING APPARATUS

Robert E. Gosnell, Bucyrus, and Adrien F. Casler, East Cleveland, Ohio, assignors to General Electric Company, a corporation of New York Application November 1, 1951, Serial No. 254,294

3 Claims. (Cl. 49—7)

Our invention relates in general to apparatus for reshaping the ends of glass tubes to form end collars of reduced diameter thereon, and more particularly to a forming roll head assembly for such apparatus.

Tubular fluorescent and incandescent lamps in general use at present employ a tubular glass envelope which is customarily provided at each end with a basing collar of reduced diameter for the mounting of a base thereon. It is desirable that these end collars not only be concentric with the rest of the tube but that they also be of uniform dimensions.

The reshaping apparatus heretofore preferably employed for producing such end collars has comprised a forming head provided with a rotatable spindle carrying a plurality (preferably three) of outer forming rollers positioned therearound which are bodily rotated around the heated end of a stationary positioned glass tube and moved inwardly against the outer side of the tube end to compress the glass against an inner forming plug or center roll inserted in the end of the tube. In prior apparatus of this general type, the inward movement of the outer forming rollers has been effected by means of separate levers for each roller, the levers being pivoted on the spindle and operating to radially move slide members carrying the outer forming rollers. Such lever-actuated slide arrangements, however, have the disadvantage that an appreciable amount of wear develops between the moving parts after an extended period of use, as a result of which the outer forming rollers are not all moved inwardly toward the tube end to the same degree and thus are not maintained concentrically located about the tube end during the rolling operation. When such a condition develops, therefore, not all of the outer forming rollers contact the tube end, with the result that undesired local thickenings or humps are formed in the glass collar just ahead of the point where the one or two rollers which actually do engage the tube end leave the glass when the rollers are withdrawn radially outward away from the tube end at the conclusion of the collar-forming operation.

It is an object of our invention, therefore, to provide apparatus of the above general type in which the closed diameter of the several outer forming rollers is always concentric with the center forming roller or plug even after an extended period of service.

Another object of our invention is to provide apparatus of the above general type having means for individually adjusting the position of each of the outer forming rollers radially of the tube axis whereby the closed diameter of the several rollers can be maintained concentric with the center forming roller or plug at all times during the use of the apparatus.

Still another object of our invention is to provide apparatus of the above general type which will effectively contain within the forming head the lubricant employed for the moving parts thereof and thus prevent it from being thrown out during the spindle rotation and depleted, with consequent need for periodic relubrication or likelihood of damage to unlubricated moving parts of the apparatus.

In accordance with the invention, the outer forming rollers of the reshaping apparatus are mounted on rocker arm means which are pivotally supported on the rotating spindle to thereby swing the rollers inwardly toward and away from the tube end and which are actuated by a common actuating slide member or rod extending axially through and keyed to the spindle but axially slidable relative thereto, the actuating slide rod being formed with spiral cam surfaces which engage with corresponding spiral cam surfaces on the rocker arm means whereby to effect rocking movement of the latter upon axial displacement of the slide rod relative to the spindle.

Further objects and advantages of our invention will appear from the following description of a species thereof and from the accompanying drawing.

Figure 4:
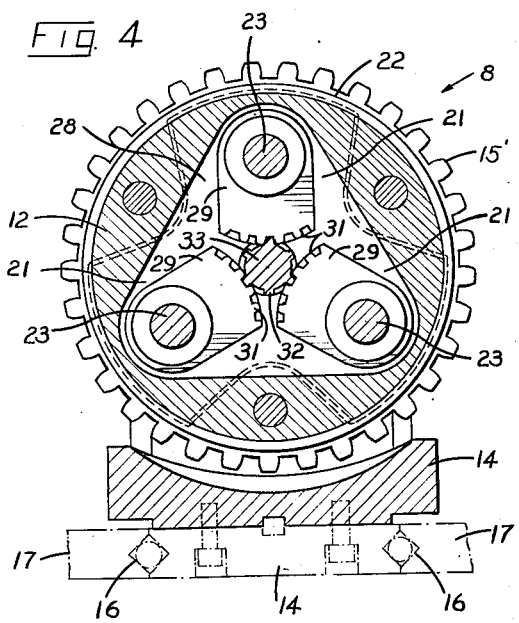

In the drawings, Fig. 1 is a diagrammatic view, in transverse vertical section, of a glass tube end collar forming apparatus provided with reshaping mechanism comprising our invention, and illustrating the path of travel of the glass tube as it is carried by the indexing turret through the several work stations of the apparatus; Fig. 2 is an end elevation, on an enlarged scale, of the forming mechanism comprising our invention and showing the outer forming rollers thereof in their closed position pressed against the tube end; Fig. 3 is a longitudinal vertical section through the forming mechanism on the line 3—3 of Fig. 2; and Fig. 4 is a transverse vertical section on the line 4—4 of Fig. 3.

Referring to the drawing, the invention is there shown as embodied in apparatus of the type shown in U. S. Patent 2,284,089, Hahn et al., in the general operation of which the glass tube 1 to be processed is placed in an indexing conveyor or turret which then carries the tube in a horizontal position through a succession of heating stations where the ends of the tube are heated to a softened workable condition, and thence to a reshaping station where the softened tube ends are contracted or rolled inwardly to form end collars of reduced diameter, after which the reshaped tubes are then discharged from the conveyor at a subsequent unloading station. In its general arrangement the said apparatus comprises a vertical conveyor in the form of a pair of horizontally spaced turret wheels 2 (only one of which is shown in Fig. 1) which are mounted on a horizontal shaft 3 which is intermittently actuated by suitable indexing mechanism (such as illustrated in the above-mentioned Hahn et al. patent) to impart an indexing movement to the turret. The turret wheels 2 are provided, at spaced points therearound, with aligned recesses 4 in their peripheries and associated holder means in the form of pairs of cooperating jaws 5, 5 for receiving and holding in a horizontal position the glass tubes 1 to be processed. The glass tubes 1 are fed into the turret at the loading station A, the tubes rolling down an inclined track 6 into the turret recesses 4 and between the opened holder jaws 5 of the turret. Upon subsequent index movement of the turret 2, the tube is first positioned longitudinally in the holder means 5, after which the jaws 5 are then closed against the glass tube to grip and hold it firmly in place in such longitudinally fixed position. The tube 1 is then carried by the turret 2 through an idle station B and thence through successive heating stations C, D and E where gas burners 7, located at each of said stations opposite the respective ends of the tube when positioned at such stations, are moved toward and over the tube ends during the dwell of the tube at each of said stations to thereby direct gas heating fires against and heat the ends of the tube 1 to a softened, pliable condition ready for reshaping. From the last heating station E the glass tube 1 is carried by the turret 2 to the forming or reshaping station F where forming mechanisms 8, constructed in accordance with our invention and located at such station opposite the respective ends of the tube 1 when positioned at such station, are moved toward the tube ends to first embrace and then press the sides of the tube ends radially inward to form reduced diameter portions or end collars of the desired final form thereon. After the collar-forming operation the forming mechanisms are withdrawn from over the ends of the glass tube 1 and the latter then carried by the turret 2 through a cooling station G where the ends of the tube are allowed to cool so as to harden the glass, and thence to station H where the holder jaws 5 are opened to release the reshaped tube 1 and the latter allowed to drop out of the turret and preferably onto a conveyor belt J which then carries the tube to suitable annealing means. Except for the specific construction of the forming mechanism 8, the construction and operation of the apparatus in general is exactly the same as that described in the aforesaid Hahn et al. Patent 2,284,089, and reference may be had to the said patent for a more detailed description thereof.

In accordance with the invention, the forming or reshaping mechanism 8, which is duplicated at both ends of the apparatus and reshapes both ends of the glass tubes 1 simultaneously, comprises a centrally positioned inner forming roller 9 and a plurality (preferably three) of outer forming rollers 10 uniformly spaced about the center roller 9. The center roller 9 is mounted on the outer side of a circular cover plate 11 on the end of a rotatable hollow spindle 12 (Fig. 3) and is moved into the open end of the glass tube 1 when the latter is positioned by the turret at the forming station F. The outer forming rollers 10 move in a generally radial inward direction toward the end of the glass tube 1 and press a narrow portion of the length of the tube back from its end into contact with the center roller 9. The hollow spindle 12 is mounted for rotational movement about its own axis and with its said axis located in alignment with the tube holder means 5 and the axis of the tube 1 carried thereby, when the latter are positioned at the forming station F. The center forming roller 9 is rotatably mounted on the spindle 12 with its axis of rotation coincident with that of the spindle. The spindle 12 is rotatably mounted in ball bearings 13 mounted in a support bracket or slide 14, and it is continuously rotated by an electric motor (not shown) which drives the spindle through a gear drive comprising a spur gear 15 meshed with a spur gear 15' mounted on the spindle 12, in the same manner illustrated in the previously mentioned Hahn et al. patent.

The support bracket 14 is slidably mounted in a guideway 16 (Fig. 4) formed in a stationary part 17 of the apparatus frame so as to be movable toward and away from the end of the glass tube 1 in the holders 5 and thereby axially advance the spindle 12 into and out of its operative position. The sliding movement of the support slide 14 is effected by a barrel cam 18 having a cam groove 19 in which rides a cam follower roller 20 projecting from the under side of the slide 14. The cam 18 is mounted on a cam shaft (not shown) which is rotated, in timed relation with the index of the turret 1, in the same manner and by the same means shown and described in the aforesaid Hahn et al. Patent 2,284,089.

In accordance with the invention, the movement of the outer forming rollers 10 radially inward against the end of the glass tube 1 and outward away therefrom is effected by separate rocker arm means 21 for each roller 10. The rocker arm means 21 are mounted on an enlarged housing portion 22 of the spindle 12 in uniformly spaced relation concentrically about the spindle axis, and they each comprise a rocker shaft 23 journalled in bushings 24 and 25 mounted in the cover plate portion 11 and in a cooperating flanged head portion 26 of the spindle which together form the housing 22 thereon. The rocker shafts 23 are mounted in their bushings 24, 25 to rotate about axes extending parallel to the spindle axis and they are each provided, outwardly of the cover plate 11, with an operating or outer roller support arm 27 rigidly fastened to the shaft so as to rotate therewith. Each of the outer forming rollers 10 is rotatably mounted on its respective support arm 27 in a position offset from the rocker shaft axis and with its rotational axis extending parallel to the rocker shaft axis.

For effecting the rocking movement of the rocker arm means 21, each rocker arm shaft 23 is provided, within the chamber 28 of the spindle housing 22, with an actuating arm 29 which is fixed on the shaft and which, in the particular case illustrated, comprises an integral sector gear formed with spiral gear teeth 31 having an appreciable helical pitch angle of, for example, 45° or thereabouts. The spiral teeth 31 of the sector gear 29 are intermeshed with corresponding spiral gear teeth 32 formed on the inner end of an actuating slide member or rod 33 extending axially through the hollow interior of and mounted within the spindle 12. The actuating rod 33 is keyed to the spindle 12 (as indicated at 34) so as to rotate as a unit therewith, but be slidable axially of the spindle. When the actuating slide rod 33 is moved axially relative to the spindle 12, the intermeshing spiral gear teeth 32, 31 on the rod 33 and sector gears 29 act as cam means to simultaneously rock all of the rocker arm means 21 and swing the outer forming rollers 10 thereon either radially inward or outward of the spindle axis, depending on the direction of axial movement of the actuating rod. The sliding movement of the actuating rod 33 is imparted thereto by a slide 35 provided with a cam follower roller 36 which rides in a cam groove 37 formed in a barrel cam 38 mounted on the same cam shaft (not shown) on which the cam 18 is mounted. The slide 35 is mounted for sliding movement in the same guideway 16 in which the spindle supporting slide 14 is mounted, and it engages the actuating rod 33 through a ball bearing 39 so as to permit the rod to rotate with the spindle 12.

With the mechanism described and illustrated for operating the outer forming rollers 10, the closed diameter of the said rollers is always maintained concentric with the center roller 9 at the end of the collar forming operation. However, if for any reason these rollers 10 should get out of adjustment so as not to be concentric with the central roller when in their closed position, means are provided for readily adjusting their position radially of the center roller to restore their concentricity. For such purpose, the support arms 27 for the rollers 10 are split parallel to and through their rocker shaft receiving bores 40, as by means of the slot 41, to form two spring arm portions 42, 43 which are clamped tightly against the rocker shaft by clamp screws 44. By unloosening the screws 44 the roller support arms 27 can be adjusted to and clamped in the exact rotational positions on the shaft necessary to center all of the outer forming rollers 10 about the center roller 9. This adjustment is made with the rollers 10 in their closed position, against a gauge placed on the center roller 9 of the correct diameter corresponding to the final outside diameter of the collar to be formed on the glass tube 1, so as to assure their true concentricity about the center roller at the conclusion of the collar rolling operation. The adjustment of the outer forming rollers 10 in this manner therefore avoids the formation of humps or local thickenings in the glass tube end collar at the end of the collar forming operation such as are produced when only one or two of the outer rollers contact the glass instead of all such rollers—a condition which obtains when the outer rollers do not concentrically close around the center roller during the collar forming operation.

To minimize the tendency of the centrifugal force developed by the rotation of the outer rollers 10 about the spindle axis to throw the rollers radially outward of the said rotational axis and thereby increase the force required to move the rollers radially inward against the glass tube end, the roller support arms 27 are formed with extensions 45 at the side of the rocker shaft 23 opposite to that side thereof on which the rollers are located, which extensions 45 act as counterweights for at least partially counterbalancing the outer centrifugal thrust of the rollers. By thus minimizing the force required to close the outer rollers 10, the wear on the actuating means therefor, such as the operating cam means 31 and 32, is correspondingly minimized.

The arrangement of the apparatus according to the invention whereby those roller actuating parts which are mounted on the spindle 12 (i. e., the rocker shaft 23 and gears 29 and 32) are enclosed within a closed housing 22 thereon, provides a construction which will effectively contain the lubricant employed for such moving parts and prevent it from being thrown out from the rotating spindle by centrifugal force. As a result, the lubricant employed for such movable actuating parts is trapped within the housing 22 and is thus kept from being prematurely depleted and possibly causing damage to the said parts. The lubricant within the spindle housing 22 is thrown outward by centrifugal force to the peripheral wall of the housing where it then operates to lubricate the intermeshing spiral gear teeth 31 and 32, the bearings 24 and the rocker shaft 23.

In the operation of the forming apparatus, when a glass tube 1 with its opposite ends heated to a pliable condition is indexed into position at the forming station F, the cams 18 and 38, through the cam grooves 19 and 37 and cooperating cam follower rollers 20 and 36, move the slides 14 and 35 and therefore the rotating spindle 12 and actuating rod 33 in unison toward the associated end of the glass tube 1 and into operative forming position to cause the center forming roller 9 to be inserted into the end of the glass tube (as shown in Fig. 3) and the outer forming rollers 10 to be positioned about and rotated around the said tube end. While the cam 18 then holds the spindle 12 longitudinally fixed in place in such advanced position, the other cam 38 draws the actuating rod 33 a slight distance backward relative to the spindle with the result that the spiral gear 32 on the actuating rod 33 acts as a cam to rotate the sector gears 29 and therefore rock the rocker arm means 21 in a direction to simultaneously and uniformly move the outer forming rollers 10 (which are rotating around the tube) inwardly against and concentrically about the softened glass tube end so as to press or roll the glass inwardly against the center roller 9 and thus form an end collar 46 on the tube of the desired shape. Upon completion of the collar rolling operation, the actuating rod 33 is first advanced by its operating cam 38 relative to the spindle 12 which is still maintained in fixed longitudinal position by its operating cam 18, to thereby rotate the rocker arm means in the opposite direction and return the outer forming rollers 10 to their opened or retracted position, whereupon both the spindle 12 and the actuating rod 33 are then withdrawn in unison by their respecitve operating cams 18 and 38 and returned to their inoperative position away from the end of the glass tube 1 so as to permit index of the reshaped tube away from and index of the succeeding unshaped tube to the forming station F.

Although a preferred embodiment of our invention has been disclosed, it will be understood that the invention is not to be limited to the specific construction and arrangement of parts shown, but that they may be widely modified within the spirit and scope of our invention as defined by the appended claims.

What we claim as new and desire to secure by Letters Patent of the United States is:

1. Apparatus for reshaping the heated end of a glass tube to form a collar thereon, comprising holder means for holding the tube in a fixed forming position, a hollow spindle axially aligned with said holder means and the tube therein, support means rotatably mounting said spindle for rotation about its axis, means connected to said spindle for rotating it, a center plug mounted on said spindle for insertion into the end of said tube, a plurality of rocker arm means mounted on said spindle at spaced points therearound and pivotable thereon about respective axes extending parallel to the spindle axis, said rocker arm means each having an actuating arm portion and a roller arm portion pivotally carrying an outer forming roller alongside said plug to rotate about an axis parallel to the spindle axis, an actuating slide member extending through and slidable axially of said hollow spindle but rotatably interlocked therewith, and cam means operative upon sliding movement of said actuating slide member relative to said spindle to pivot said rocker arm means and move the forming rollers thereon inwardly toward said center plug whereby to engage and contract the heated end of the tube against said center plug, said cam means comprising spiral cam surfaces on said actuating slide member engaging with corresponding spiral cam surfaces on the actuating arm of each rocker arm means.

2. Apparatus for reshaping the heated end of a glass tube to form a collar thereon, comprising holder means for holding the tube in a fixed forming position, a hollow spindle axially aligned with said holder means and the tube therein, support means rotatably mounting said spindle for rotation about its axis, means connected to said spindle for rotating it, a center roller rotatably mounted on said spindle to rotate about the axis thereof, a plurality of rocker arm means mounted on said spindle at uniformly spaced points therearound and pivotable thereon about respective axes extending parallel to the spindle axis, said rocker arm means each having an actuating arm portion and a roller arm portion pivotably carrying an outer forming roller alongside said center roller to rotate about an axis parallel to the spindle axis, an actuating rod slidably mounted within said hollow spindle for axial movement relative thereto but rotatably interlocked therewith, and cam means operative upon axial movement of said actuating rod relative to said spindle to simultaneously pivot said rocker arm means and move said forming rollers uniformly inward toward said center roller to a predetermined distance therefrom whereby to engage and contract the heated end of the tube against said center roller, said cam means comprising a spiral gear on said actuating rod engaging with spiral gear teeth on the actuating arm of each rocker arm means.

3. Apparatus for reshaping the heated end of a glass tube to form a collar thereon, comprising holder means for holding the tube in a fixed forming position, a hollow spindle axially aligned with said holder means and the tube therein and provided with a closed housing at its end nearest said holder means, support means rotatably mounting said spindle for rotation about its axis, means connected to said spindle for rotating it, a center plug mounted on the outer end of said spindle housing for insertion into the end of said tube, a plurality of rocker arm means mounted on said spindle housing at spaced points therearound and pivotable thereon about respective axes extending parallel to the spindle axis, said rocker arm means each having an actuating arm portion interiorly of said housing and a roller arm portion exteriorly of said housing and pivotably carrying an outer forming roller alongside said plug to rotate about an axis parallel to the spindle axis, an actuating slide member extending through said hollow spindle into the said housing thereof, said slide member being slidable axially of said spindle but rotatably interlocked therewith, and cam means operative upon sliding movement of said actuating slide member relative to said spindle to pivot said rocker arm means and move the forming rollers thereon inwardly toward said center plug whereby to engage and contract the heated end of the tube against said center plug, said cam means comprising spiral cam surfaces on said actuating slide member engaging with corresponding spiral cam surfaces on the actuating arm of each rocker arm means.

ROBERT E. GOSNELL.
ADRIEN F. CASLER.

REFERENCES CITED

The following references are of record in the file of this patent:

UNITED STATES PATENTS

| Number | Name | Date |
|---|---|---|
| 2,284,089 | Hahn et al. | May 26, 1942 |
| 2,364,673 | Stuckert et al. | Dec. 12, 1944 |
| 2,394,115 | Snyder | Feb. 5, 1946 |
| 2,470,923 | Fisler | May 24, 1949 |